United States Patent
Mathews, Jr.

(10) Patent No.: US 6,433,693 B1
(45) Date of Patent: Aug. 13, 2002

(54) APPARATUS AND METHOD FOR BOIL PHASE DETECTION BASED ON ACOUSTIC SIGNAL FEATURES

(75) Inventor: Harry Kirk Mathews, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/628,375

(22) Filed: Jul. 31, 2000

(51) Int. Cl.⁷ .............................................. G08B 21/00
(52) U.S. Cl. ...................... 340/584; 340/588; 340/603; 73/587; 219/494; 219/497; 374/102
(58) Field of Search ................................ 340/603, 540, 340/582, 588, 589, 584; 219/494, 481, 501, 497, 502; 73/587, 590; 374/102

(56) References Cited

U.S. PATENT DOCUMENTS

| | | | |
|---|---|---|---|
| 2,757,869 A | | 8/1956 | Ray .......................... 236/20 A |
| 4,140,021 A | | 2/1979 | Nomura et al. ................ 73/587 |
| 4,493,980 A | | 1/1985 | Payne et al. ........... 219/448.12 |
| 4,740,664 A | | 4/1988 | Payne et al. ........... 219/448.12 |
| 4,869,233 A | | 9/1989 | Stulen et al. ............. 126/374.1 |
| 4,952,766 A | | 8/1990 | McDonald .................. 219/492 |
| 4,962,299 A | * | 10/1990 | Duborper et al. ........... 340/588 |
| 5,053,111 A | * | 10/1991 | Ellerbe, Jr. ..................... 203/1 |
| 5,067,474 A | | 11/1991 | Chi .......................... 126/374.1 |
| 5,101,774 A | | 4/1992 | Marziale et al. .......... 122/504.2 |
| 5,378,978 A | * | 1/1995 | Gallo et al. .................. 323/241 |
| 5,681,496 A | * | 10/1997 | Brownlow et al. .......... 219/707 |
| 5,947,370 A | * | 9/1999 | Rona et al. ................ 236/20 A |
| 6,118,104 A | * | 9/2000 | Berkcan et al. ............. 340/540 |
| 6,118,105 A | * | 9/2000 | Berkcan et al. ............. 219/497 |

FOREIGN PATENT DOCUMENTS

| | | |
|---|---|---|
| DE | 196 38 355 | 9/1996 |
| EP | 0 806 887 | 11/1997 |
| GB | 2143053 | 1/1985 |

OTHER PUBLICATIONS

"Acoustic Sensing System for Boil State Detection and Method for Determining Boil State," E. Berkcan et al., Ser. No. 09/273,064 (GE docket RD–26,042), filed Mar. 19, 1999.

* cited by examiner

Primary Examiner—Daniel J. Wu
Assistant Examiner—Davetta W. Goins
(74) Attorney, Agent, or Firm—John F. Thompson; Jill M. Breedlove

(57) ABSTRACT

An apparatus and method for determining at least one boil phase of a liquid is provided. The boil phase is determined from an acoustic signal generated by the liquid during heating, the acoustic signal is measured by an acoustic sensor. The apparatus comprises at least one filter connected to the acoustic sensor. The at least one filter receives and filters the acoustic signal to eliminate excess variation and to eliminate high frequency noise from the acoustic signal producing a filtered acoustic signal. At least one derivative estimation filter is also provided and is connected to the at least one filter. The at least one derivative estimation filter estimates at least one derivative of the filtered acoustic signal. A processor is provided and is connected to the at least one filter and the at least one derivative estimation filter. The processor identifies the at least one boil phase of the liquid using at least the filtered acoustic signal and at least one derivative of the filtered acoustic signal.

37 Claims, 9 Drawing Sheets

APPARATUS AND METHOD FOR BOIL PHASE DETECTION BASED ON ACOUSTIC SIGNAL FEATURES

BACKGROUND OF THE INVENTION

The present invention relates to a method for determining boil phases of the contents of cooking utensils on range cook-tops. More specifically, the present invention relates to a method for determining at least one boil phase using an acoustic sensor system.

Boiling water or other fluids or foods (generically "liquids") is one of the most common uses for a range. It is typically desirable to closely monitor the boil phase of the liquid during such processes, such as, for example, to identify the pre-simmer, simmer onset, simmer and/or boil phases. In this regard, the pre-simmer phase is generally characterized by a calm liquid, and the simmer onset phase is the initial, slow bubbling of the liquid characterized by the appearance of individual bubbles. During the simmer phase, bubbles appear in jets creating the effect commonly referred to as simmering. Finally, in the boil phase, the bubbling of the liquid is generalized, resulting in the familiar turbulence of a boiling liquid. These phases can be identified by experts and experienced cooks. The formation and collapse of the bubbles during the phases create an acoustic signature that changes with the size and number of the bubbles, the rate of their formation, their collapse, and the temperature gradient in the liquid. This acoustic response includes the audible component, which can be easily observed when cooking, as well as responses in various frequency bands. It is also affected by factors including the type of cooking vessel and any ingredients in the liquid.

The boil phase is monitored for a number of reasons. First, many cooking processes require that the liquid be attended to upon identification of a particular boil phase, such as, for example, stirring or adding ingredients. In addition, the boil phase may be monitored to reduce heat after the liquid reaches a boil, either to reduce it to a simmer for cooking purposes or to prevent boil-over. Conventionally, the boil phase is monitored visually. However, such visual monitoring can interfere with the user's ability to prepare other foods or be otherwise fully productively disposed during heating of the liquid. Also, a busy or inexperienced user may fail to accurately identify a boil phase of interest in a timely manner. Boil-over can result in a burned-on mess or, in the case of gas ranges, extermination of the cooking flame. Moreover, a liquid not monitored upon boiling can boil dry, resulting in burning of the food, damage to cooking utensils or other problems.

Increasingly, in the market for household appliances, manufacturers seek to provide, and consumers desire to have, appliances with a greater degree of automated operation and control. With the increasing affordability of integrating computing power into an appliance, there exists a potential to provide the increased levels of automated control. However, the information gathering tools or devices that will interact with a computer or processor in monitoring or controlling the operation of the appliance must also have desirable cost/performance attributes.

For cooking appliances generally, and for electric, inductive, and gas range cook-tops specifically, automation or partial automation of control of the cooking process, or monitoring of cooking on a cook-top, has traditionally focused on temperature monitoring or sensing. Various temperature sensors have been used for sensing the temperature of a surface heating unit or a cooking utensil positioned thereon, and for controlling the heat input to the heating unit, based upon the sensed temperature. Another form of temperature based sensing is a direct food probe which is inserted into the liquid to measure temperature directly. Such sensors have commonly been used in connection with glass-ceramic radiant cook-tops.

Temperature-based sensing systems for ranges or cook-tops may indirectly or inferentially provide information regarding a boil phase of a liquid contained in a utensil and being heated on the cook-top. However, it is difficult to reliably determine the boil phase since the correlation between temperature and boil phase depends on a number of variables including, but not limited to, the type of liquid, the amount of liquid, any additives, the position of the utensil, and the warping of the utensil. For instance, it is well known that the addition of salt into water raises the boiling temperature. Environmental conditions such as elevation can also affect the temperature associated with boil phases. Finally, the position of the temperature sensor and its calibration can also have a significant impact on achievable accuracy. Therefore, there is a desire for a robust determination of the boil phase that also take into account the cooking modalities, vessels used, various user interactions, and other variations or disturbances in the equipment or environment.

BRIEF SUMMARY OF THE INVENTION

In one exemplary embodiment, an apparatus for determining at least one boil phase of a liquid is provided. The boil phase is determined from an acoustic signal generated by the liquid during heating. An acoustic sensor measures the acoustic signal. The apparatus comprises at least one filter connected to the acoustic sensor. The filter receives and filters the acoustic signal to eliminate excess variation and high frequency noise from the acoustic signal producing a filtered acoustic signal. A derivative estimation filter bank is connected to the filter. The derivative estimation filter bank comprises a plurality of matched filters used to estimate at least one derivative value of the filtered acoustic signal. Each of the plurality of matched filters of the derivative estimation filter bank comprises a first time scale and a first coefficient length. A second derivative estimation filter bank is connected to the filter. The second derivative estimation filter bank also comprises a plurality of matched filters used to estimate the at least one derivative value of the filtered acoustic signal. Each of the plurality of matched filters of the second derivative estimation filter bank has a second time scale and a second coefficient length. A processor is connected to the filter and both the derivative estimation filter banks. The processor identifies the boil phase of the liquid using at least the filtered acoustic signal and the at least one derivative value of the filtered acoustic signal that are provided from at least one of the derivative estimation filter banks.

In another exemplary embodiment, a method of determining at least one boil phase of a liquid is provided. The method measures an acoustic signal generated by a liquid during heating. An acoustic sensor measures the acoustic signal. The method includes filtering the acoustic signal to remove excess variation and high frequency noise. At least one derivative of the filtered acoustic signal is estimated using a plurality of derivative estimation filter banks. Each of the plurality of derivative estimation filter banks has a unique predetermined coefficient length and a unique time scale. One of the plurality of derivative estimation filter banks is used to estimate the at least one estimated derivative of the filtered acoustic signal. The one of the plurality of derivative estimation filter banks is chosen based on the length of time of boiling. The at least one boil phase of the liquid is identified by analyzing the filtered acoustic signal and the at least one estimated derivative of the filtered acoustic signal.

DETAILED DESCRIPTION OF THE INVENTION

Various phases of boiling are detected acoustically because the acoustic characteristics of the phases are distinctive and repeatable. The phases can be identified by the action of the boiling liquid. Convection describes the presimmer phase where the liquid is initially heated from ambient temperature to a temperature approaching the boiling point. The simmer onset phase describes the first signs of coalescence or nucleation of gases. During the simmer onset phase, the gases dissolved in the liquid and the gases produced by the heating appear at sites on the cooking utensil, for example, surface irregularities along the bottom and side walls of the cooking utensil. These gases form bubbles that travel towards the surface of the liquid but typically collapse before reaching the surface due to temperature gradients in the liquid. This property of heating the liquid produces a characteristic sound. During the simmer phase, jet nucleation occurs where the gas bubbles are formed more frequently and larger in size. These bubbles rise more rapidly to the surface of the liquid and escape in characteristic columns. A highly agitated and turbulent liquid identifies the boil phase and/or rolling boil phase where an increased number of gas bubbles are formed and escape from the liquid.

Figure 1:
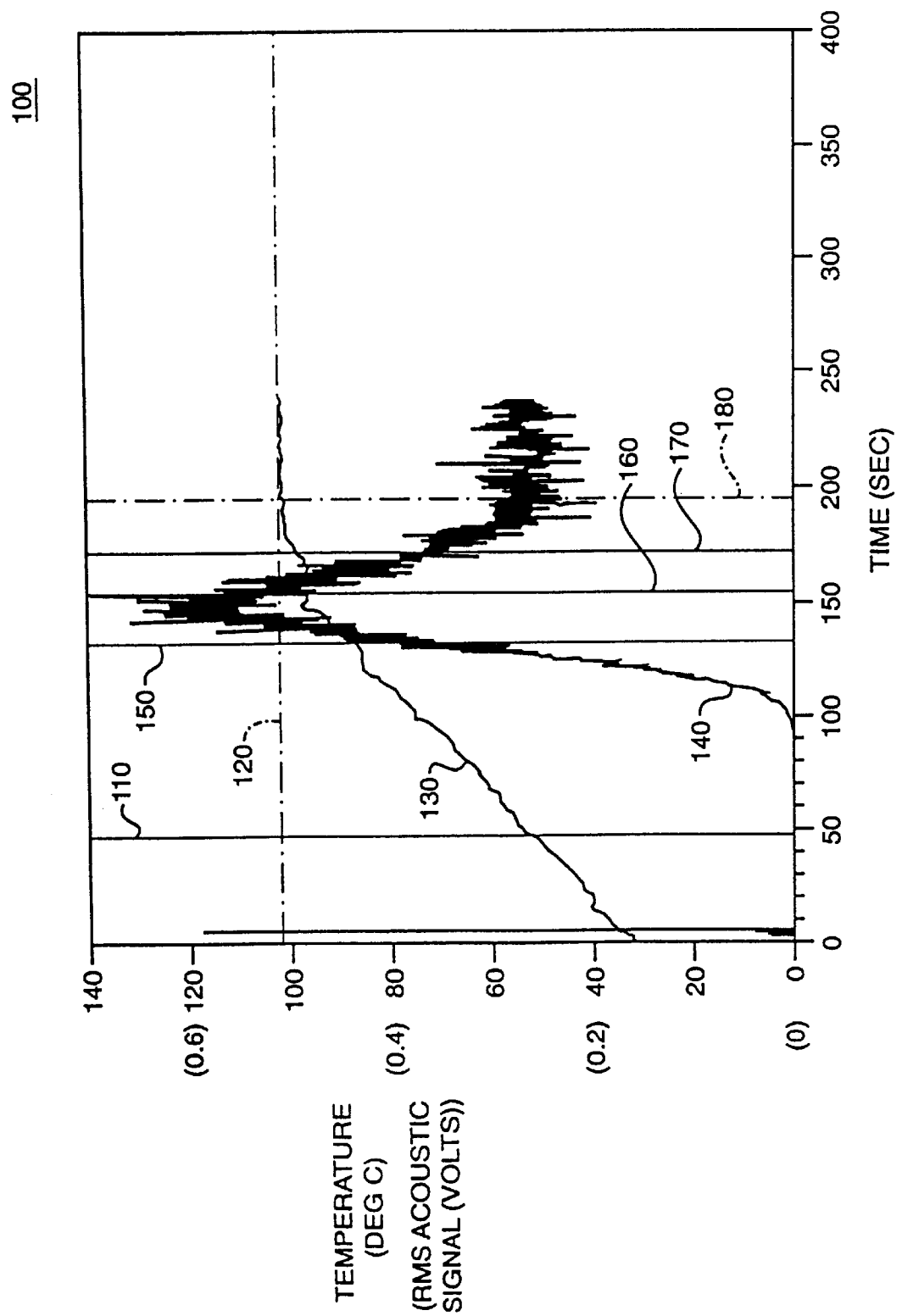
FIG. 1 is a graph plotting the characteristic response in an acoustic sensor created by boiling liquid.

In FIG. 1, a characteristic acoustic waveform 100 provided during heating and boiling of a liquid includes an acoustic signal 140. For reference, the liquid temperature 130 and a water boil temperature 120 are included. Also, the various boil phases are identified by vertical lines that pass through the filtered acoustic signal 140 at point representing the various boil phases. The acoustic signal 140 includes a point of leaving the lower plateau phase 110 that indicates heating of the liquid from ambient temperature. The presimmer phase 150 is provided after a further heating of the liquid and is identified by a dramatic increase in the acoustic signal 140. After a peak in the acoustic signal 140, a simmer phase 160 is provided. A pre-boil phase 170 is indicated when the temperature approaches the water boil temperature 120 and when the acoustic signal 140 begins to plateau. The rolling boil phase 180 is indicated when the water boil temperature 120 is reached and the acoustic signal 140 reaches a plateau.

Figure 2:
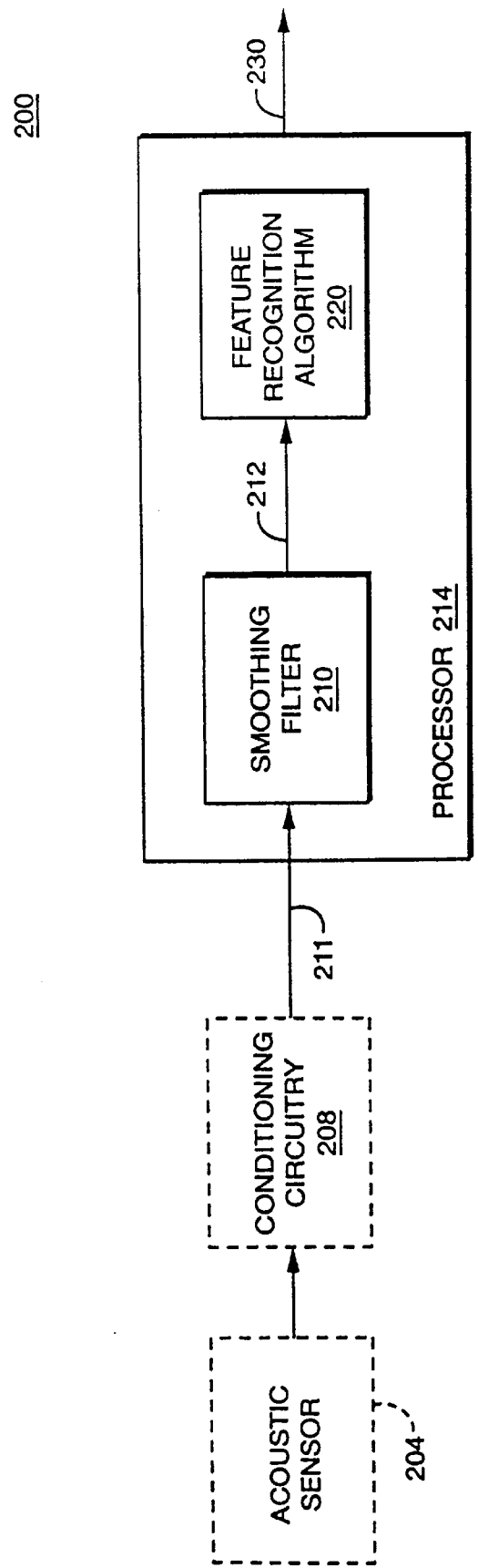
FIG. 2 is a functional block diagram of a processor employing a low pass filter and a feature recognition algorithm of the present invention.
Figure 3:
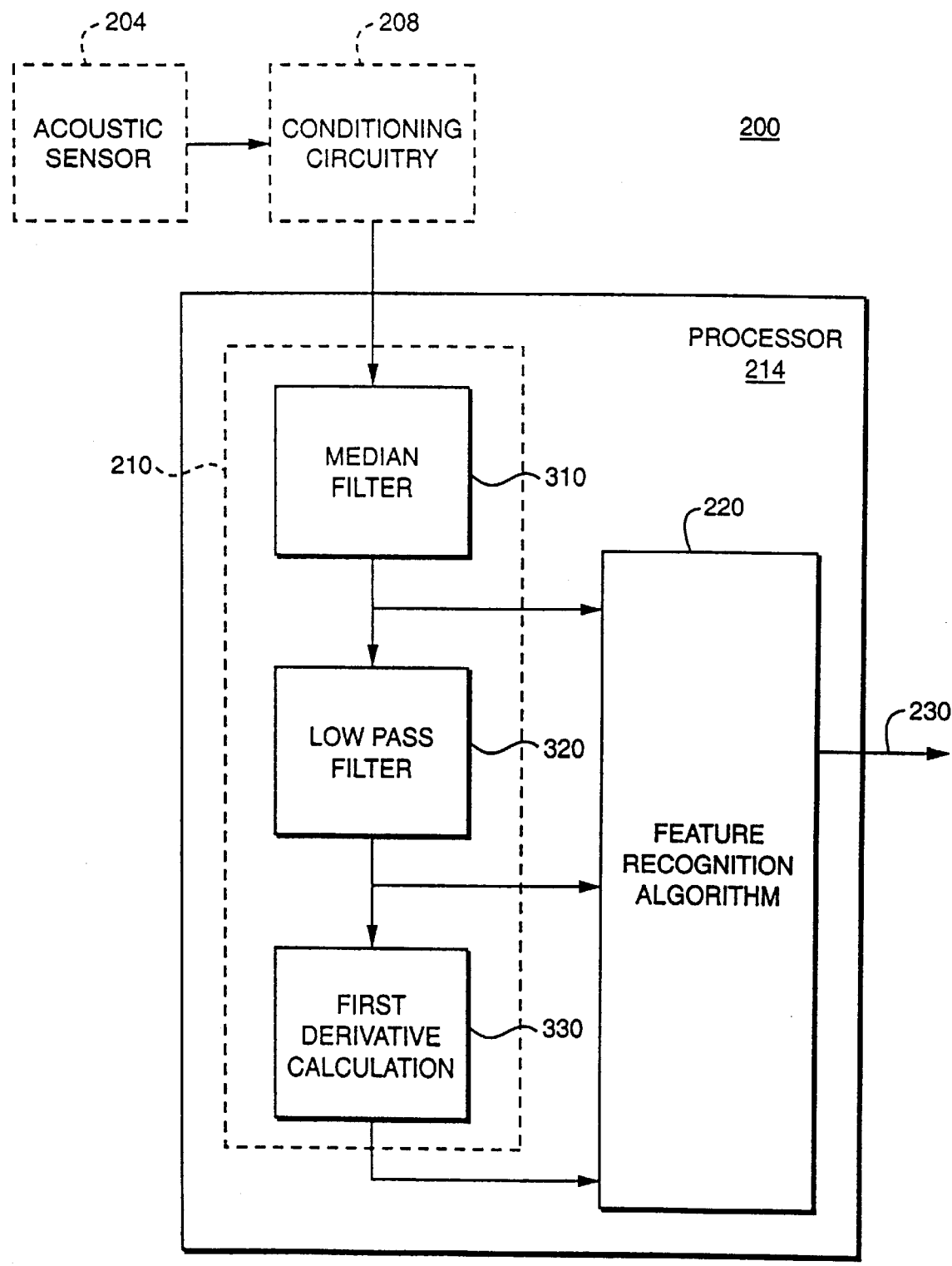
FIG. 3 is a block diagram of one exemplary embodiment of the acoustic detection system.

An acoustic detection system 200 (FIG. 2) is used to detect and/or acquire the characteristic acoustic waveform 100 of a utensil (not shown) and contents positioned on the cooktop (not shown). In one embodiment as shown in FIG. 2, the acoustic detection system 200 includes an acoustic sensor 204 connected to conditioning circuitry 208 that is coupled to a processor 214. In one embodiment, the acoustic sensor 204 directly measures the root-mean-square (RMS) value of the acoustic signal 140. In another embodiment, the acoustic sensor 204 measure raw acoustic data from the cooktop (not shown) and the conditioning circuitry 208 converts the raw acoustic data into an RMS value corresponding to the acoustic signal 140. The processor 214 includes a smoothing filter 210 such as a low pass filter 320 (FIG. 3) and median filter 310 (FIG. 3). The processor 214 also includes a feature recognition algorithm 220. In a preferred embodiment, the smoothing filer 210 is selected to provide an average of the acoustic signal 140. In addition, the smoothing filter 210 is selected to fine tune the performance of the acoustic sensor 204 for a particular cooktop (not shown) or other cooking modality. Also, the smoothing filter 210 may be utilized to exclude or filter out sources of interference or potential interference such as ambient acoustic emissions or noise. The acoustic sensor 204 that is used in the acoustic detection system 200 may be selected from various sensors such as microphones, piezoelectric vibration/acceleration sensors, and semiconductor acceleration sensors. In another embodiment, an accelerometer such as, for example, a micro-electro-mechanical system (MEMS) can be used as an acoustic sensor 204.

In another embodiment, as shown in FIG. 3, the smoothing filter 210 includes a median filter 310 that is used to minimize outlying data portions of the acoustic signal 140. A low pass filter 320 is also provided to remove high frequency noise from the acoustic signal 140. In addition, a derivative estimation filter 330 is provided to estimate derivative values of the acoustic signal 140. The median filter 310, the low pass filter 320 and the derivative estimation filter 330 are connected to a feature recognition algorithm 220. It should be appreciated that in FIGS. 1 and 2 the smoothing filter 210 is included in the processor 214 using for example an algorithm or software program. However, it should be appreciated that in other embodiments that the smoothing filter 210 can be located externally from the processor 214 and implemented using hardware-based filters and/or software/algorithmic filters.

Figure 4:
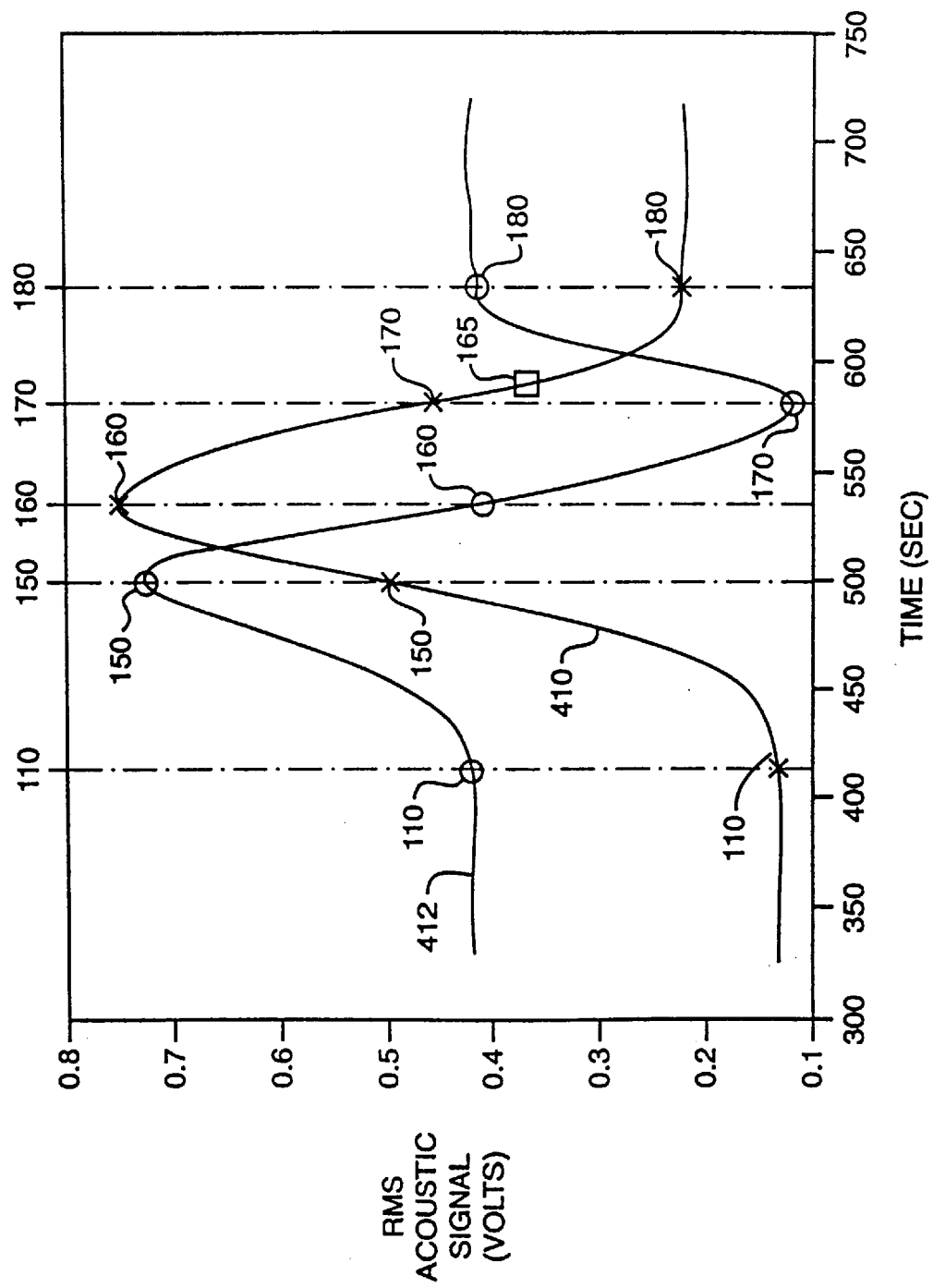
FIG. 4 is a graph of a smoothed first and second derivative plot of the acoustic signal.

In one embodiment shown in FIG. 2, the processor 214 receives and processes the filtered acoustic signal 410 (FIG. 4) provided by the acoustic sensor 204 via the median filter 310 and the low pass filter 320. In a preferred embodiment, the processor 214 is programmed with feature recognition algorithm 220 to interpret the corresponding boil phases or other boil characteristics from the filtered acoustic signal 410 (FIG. 4). During the evaluation, the processor 214 generates and evaluates the filtered acoustic signal 410 (FIG. 4) and at least the first derivative 412 (FIG. 4) of the filtered acoustic signal 410 (FIG. 4). In addition, the feature recognition algorithm 220 is provided with a set of instructions by which an output 230 from the processor 214 is generated. The acoustic detection system 200 also generates at least one boil phase signal that can be used to control a heat source (not shown) coupled to the cooktop (not shown). In one embodiment, the heat source (not shown) comprises any apparatus used to heat the contents of a utensil such as, for example, electric, inductive, microwave, and gas cooking devices. The acoustic detection system 200 may be employed to control the heat source (not shown) to sustain a rolling boil or simmer for a predetermined period of time. In addition, the acoustic detection system 200 may also be programmed to reduce the temperature of the heat source (not shown) based upon the characteristics of the acoustic signal 140 such as, point of leaving lower plateau phase 110, pre-simmer phase 150, simmer phase 160, pre-boil phase 170, rolling boil phase 180, boil over, and boil dry conditions. Additionally, the acoustic detection system 200 may control an indicator (not shown) to notify the user that a predetermined desired, or undesirable, boil phase has been reached. The indicator (not shown) can include, for example, an audible indicator or visual indicator.

In FIG. 4, the filtered acoustic signal 410 and the first derivative 412 of the filtered acoustic signal 410 are provided. The filtered acoustic signal 410 and first derivative 412 provide distinguishable data points that enable the identification of various stages of the boil phases. In addition, additional derivatives (not shown) of the filtered acoustic signal 410 can also be used to enable the identification of the various boil phases. It should be appreciated that the filtered acoustic signal 410 and the first derivative 412 are not the only features defined or taken into consideration by the processor 214 when determining the boil phase or in controlling the cooking cycle. It should also be appreciated that heuristic or empirically based features can also be defined that belong to the characteristic feature set to be used for controlling the cooking cycle. These features can be correlated to the temperature of the food being cooked in the liquid via the acoustic signal 140, the filtered acoustic signal 410, the first derivative 412 and other derivatives or distinguishing features of the filtered acoustic signal. As shown in FIG. 4, the first derivative 412 and higher order derivatives (not shown) of the filtered acoustic signal 410 can be useful in more accurately determining or characterizing the boil phase of the liquid and/or other boil characteristics such as, for example, boil over and boil dry conditions. As mentioned previously, the identification of the boil phases is possible because the acoustic signal 140 (FIG. 1) and the filtered acoustic signal 410 have various characteristic features which can be identified using at least the filtered acoustic signal 410 and the first derivative 412.

Figure 9:
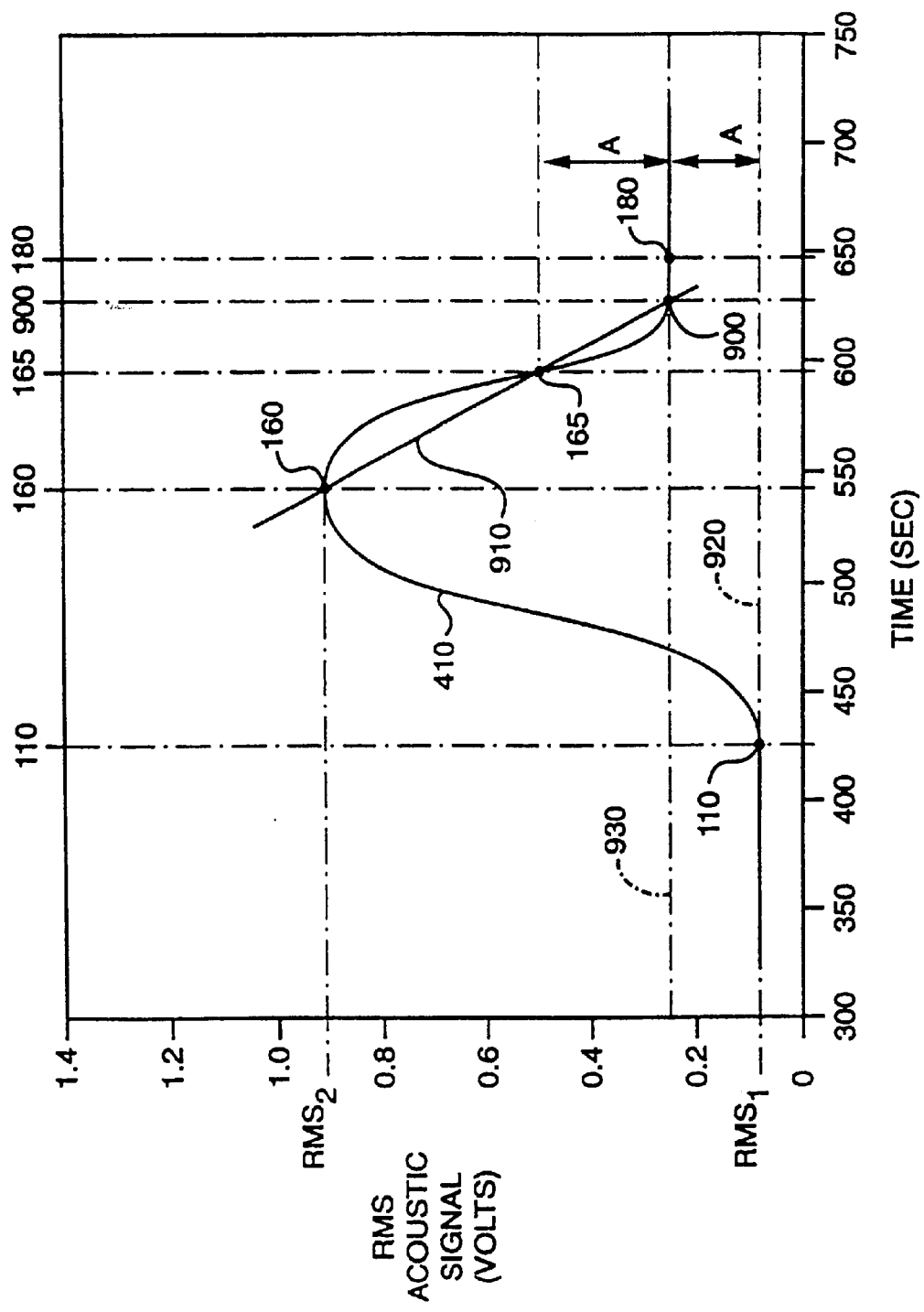
FIG. 9 is graph of the filtered acoustic signal used to extrapolate an estimated onset of boiling point.

In one embodiment, as shown in FIG. 9, an estimated onset of boiling point 900 can be predicted by extrapolating from the simmer phase point 160 and a threshold point 165. In FIG. 9, the filtered acoustic signal 410 contains the point of leaving the lower plateau 110 and the simmer phase point 160. The time interval between the point of leaving the lower plateau 110 and the simmer phase point 160 is measured and known as $\Delta T_2$. From the time value $\Delta T_2$, estimated onset of boiling point 900 or the time interval between the simmer phase point 160 and the rolling boil phase point 180 ($t_{160-180}$) can be calculated using the following equation:

$$t_{160-180} = f_1 * \Delta T_2 - \Delta T_{shift}$$

where $t_{160-180}$ is the time interval between the simmer phase point 160 and the rolling boil phase point 180; $f_1$ is a constant and has a value of about 1.4; $\Delta T_2$ is the time interval between the point of leaving the lower plateau 110 and the simmer phase point 160; and $\Delta T_{shift}$ is about 0 seconds. The calculation of $t_{160-180}$ allows the prediction of the rolling boil phase point 180 and allows the determination of a maximum point for which the processor 214 should declare that the liquid has achieved a rolling boil. It should be appreciated that the equation for $t_{160-180}$ can also be used to predict the time of the occurrence of threshold point 165 ($T_{165}$) by altering the $f_1$ value of the equation shown herein above. As such, time only measurements can be used to estimate the boil phases, the $t_{160-180}$ can be calculated to determine the time that the rolling boil point 180 will occur, and by altering $f_1$ to get $t_{165}$, the time that the threshold point 165 can be determined.

In another embodiment, an estimated onset of boil point 900 (FIG. 9) can be determined by using the root-mean-square value (RMS) of the acoustic signal at certain points. As shown in FIG. 9, the RMS values at the point of leaving the lower plateau 110 ($RMS_1$) and the simmer phase point 160 ($RMS_2$) can be used to predict the onset of boiling point 900. To determine the estimated onset of boiling point 900, the value A (FIG. 9) is calculated using the following equation:

$$A = c * (RMS_2 - RMS_1)^e$$

where A is a value that is the estimated onset of boiling phase 900; c is a constant having a value of about 1.2; $RMS_1$ is the RMS value of the acoustic signal at the point of leaving the lower plateau 110; $RMS_2$ is the RMS value of the acoustic signal at the simmer phase point 160; and e is a constant having a value of about 0.68. In FIG. 9, the value A plateau 930 is shown measured from the $RMS_1$ value or the lower plateau level 920 corresponding to the point of leaving the lower plateau 110. In addition, it should be appreciated that the measurement of the A value distance from the lower plateau level 920 may not necessarily correspond with the plateau at the rolling boil phase 180 and the A value plateau 930 can correlate to a distance higher or lower than the plateau at the rolling boil phase 180.

The value of A is doubled and again measured from either the 0 axis or the lower plateau 920. This 2A value is correlated to the filtered acoustic signal 410 and corresponds to the threshold point 165. Once the threshold point 165 and the simmer phase point 160 are known, the estimated onset of boiling point 900 is determined by extrapolating a line 910 between the simmer phase point 160 and the threshold point 165 to the point 900 on the A value plateau 930 measured from the lower plateau level 920. From the estimated onset boiling point 900, a time that the onset of boiling 900 occurs can be correlated. In addition, the time that the threshold point 165 occurs can also be correlated. From the time correlated to the onset of boiling point 900, the onset of boiling can be determined by waiting the correlated amount of time after the threshold point 165 has been reached. Therefore, the processor 214 can be programmed with the time interval from the threshold point 165 to the estimated onset boiling point 900. From this time interval, the processor 214 can declare that a boil point has been detected at earliest time of either the time corresponding to the estimated onset of boiling point 900 (as correlated above) or the time corresponding to the rolling boil phase 180 (as calculated above ($t_{160-180}$)).

Figure 5:
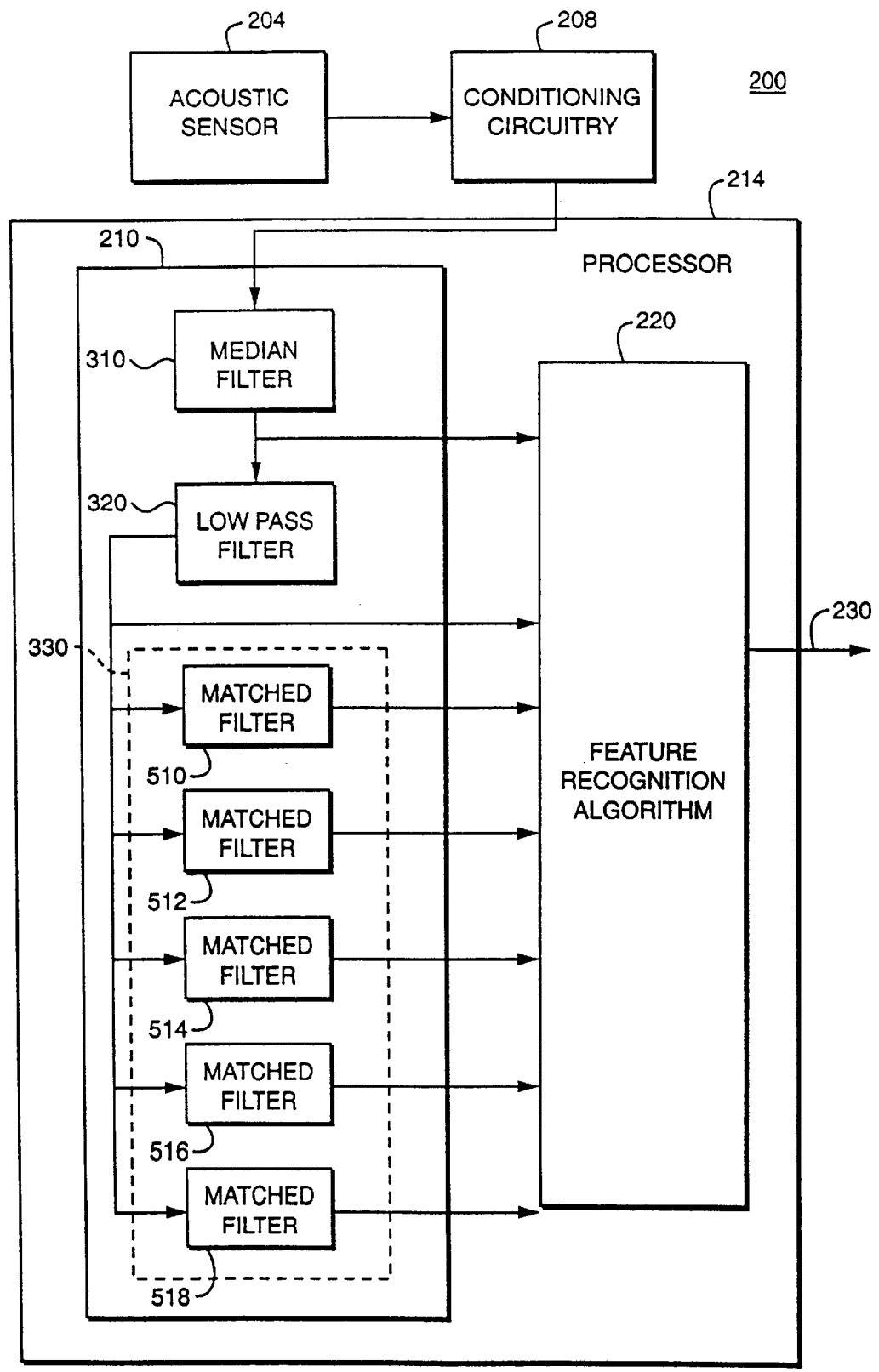
FIG. 5 is a block diagram of another exemplary embodiment of the acoustic detection system.

In another embodiment of the acoustic detection system 200 as shown in FIG. 5, the derivative estimation filter 330 includes matched filters 510–518 that are connected to a feature recognition algorithm 220 of the processor 214. In this embodiment, the matched filters 510–518 are used to estimate the derivative value of the filtered acoustic signal 410 (FIG. 4). Each of the matched filters 510–518 represent one of several different derivative values. In this regard, each of the matched filters 510–518 comprises a signal that is to be detected. In one embodiment, the signal comprises a straight line with a slope equal to one of the derivative values. In another embodiment, the matched filters 510–518 are finite impulse response (FIR) filters where the signals are normalized to unity to form the coefficients of the FIR filters. In a preferred embodiment, the matched filters 510–518 comprise five filters including two filters representing positive slope values, two filters representing negative slope values and one filter representing a zero slope value. In operation, the filtered acoustic signal 410 is passed to each of the matched filters 510–518 and the slope of the signal associated with the matched filter 510–518 having the largest output is the estimate of the derivative value of the filtered acoustic signal 410.

Figure 6:
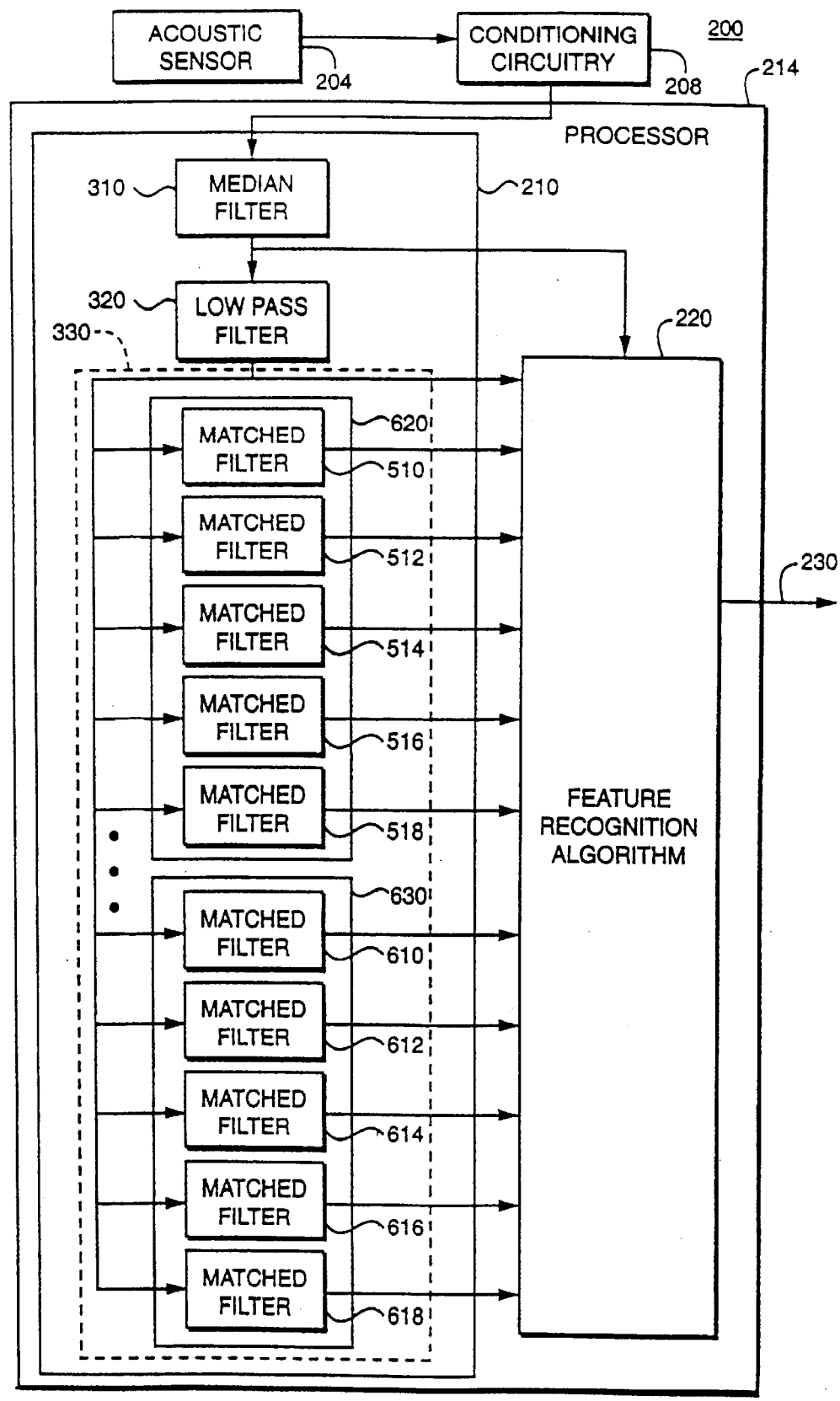
FIG. 6 is a block diagram of yet another exemplary embodiment of the acoustic detection system.

The various liquids and other contents in pan (not shown) located on the cooktop (not shown) can all require different time lengths to reach a boiling point. Therefore, the characteristic features of the filtered acoustic signal 410 can be spread out over differing time ranges depending upon the liquid and/or other contents of the pan. As shown in FIG. 6, to accommodate for these differing time lengths to reaching a boiling point and to make the estimation of the derivative more robust, the derivative estimation filter 330 can include one or more derivative estimation filter banks 620 and 630. Each of the derivative estimation filter banks 620 and 630 have different coefficient lengths and time scales. In addition, the derivative estimation filter banks 620 and 630 have processing delays inherent in the filtering and the determination of the derivative values of the acoustic signal 140 causing a proportional delay between the occurrence of a boil phase and the detection of the resultant phase by the feature recognition algorithm 220. To reduce the delay caused by filtering and determining the derivative and to provide a derivative estimation for differing boiling time lengths, the acoustic detection system 200 shown in FIG. 6 is provided. In this embodiment of the acoustic detection system 200, the derivative estimation filter 330 includes derivative estimation filter bank 620 and derivative estimation filter bank 630 that receive the filtered acoustic signal 410 and that are connected to the feature recognition algorithm 220 of the processor 214. The derivative estimation filter bank 620 includes the matched filters 510–518. The derivative estimation filter bank 630 includes matched filters 610–618. It should be appreciated that in FIG. 6, the derivative estimation filter 330 includes two derivative estimation filter banks 620 and 630. However, in other embodiments, the derivative estimation filter 330 can include more than two derivative estimation filter banks 620 and 630.

The derivative estimation filter banks 620 and 630 are used to estimate the derivative value of the filter acoustic signal 410. The multiple set of matched filters 510–518 and 610–618 makes up a parallel implementation of the derivative estimation filter 330. The derivative estimation filter banks 620 and 630 simultaneously achieve the criteria of robustness to noise and responsiveness by having different coefficient lengths and/or time scales. In this regard, each of the matched filters 510–518 and 610–618 represent one of several different derivative values. Further, each of the matched filters 510–518 and 610–618 comprise a signal that is to be detected. In one embodiment, the signal comprises a straight line with a slope equal to one of the derivative values. In another embodiment, the matched filters 510–518 and 610–618 comprise finite impulse response (FIR) filters where the signals are normalized to unity to form the coefficients of the FIR filters. In a preferred embodiment, the matched filters 510–518 of derivative estimation filter bank 620 comprise a coefficient length of 71 points at 1 hertz (Hz), and the matched filters 610–618 of derivative estimation filter bank 630 comprise a coefficient length of 142 points at 1 hertz (Hz).

The multiple set of matched filters is configured such that the derivative estimation filter banks 620–630 are divided into filter pairs. Each matched filter 510–518 and 610–618 in the pair is responsive to the same derivative value, but each matched filter 510–518 and 610–618 in the pair has a different coefficient length. In a preferred embodiment, the matched filters 510–518 and 610–618 include ten matched filters that are divided into 5 pairs where two pairs represent a positive slope values, two pairs represent a negative slope values and one pair represents a zero slope value. In another embodiment, the feature recognition algorithm 220 is divided into a two algorithms wherein a first algorithm evaluates the matched filters 510–518 having the first time scale (72 points at 1 Hz) and a second algorithm evaluates the matched filters 610–618 having the second time scale (142 points at 1 Hz). In this embodiment, the first algorithm and the second algorithm are able to determine the boil phase of the liquid. However, the first algorithm having the shorter time scale (72 points at 1 Hz) is not allowed to declare a boil phase if the length of the boil is greater than a predetermined time.

In one embodiment, the method of processing of the acoustic signal 140 to determine the boil phases involves filtering of the acoustic signal 140 and determining the first derivative 412. The filtering of the acoustic signal 140 enables the determination or recognition of inflection points, maximum values or other intermediate points that are useful in more accurately correlating the acoustic emission data to the boil phases of interest. In another embodiment, the method for determining the boil phases utilizes acoustic detection system 200 as shown in FIGS. 2–3 and 5–6. Specifically, the acoustic signal 140 shown in FIG. 1 is generated by acoustic sensor 204 and is supplied to conditioning circuitry 208 that is coupled to processor 214. Smoothing filter 210 removes anomalous spikes in the acoustic signal 140. The smoothing filter 210 includes a median filter 310 having length n wherein length n is defined as the number of sample data values required by median filter 310 to provide the median function. The median filter 310 generates a respective median filter signal value at each time step which is representative of the statistical median of the most recent n acoustic signal values. The median-filtered signal is filtered by low pass filter 320 to remove ripples and to enable robust estimation of the first derivative 412 (FIG. 4). In one exemplary embodiment, low pass filter 320 is implemented in a manner similar to the median filter 310 where the statistical median over the n sampled acoustic signal values is replaced by the statistical mean of the acoustic signal values. The filtered acoustic signal 410 (FIG. 4) generated by low pass filter 320 is used to estimate the first derivative 412 (FIG. 4). The incremental first derivative signal 412 (FIG. 4) is estimated by using the derivative estimation filter 330 that in one embodiment includes the matched filters 510–518 (FIG. 5). In one embodiment, the slope of the matched filter 510–518 having the highest output at the point of interest estimates the value of the derivative. In another embodiment, the derivative estimation filter 330 comprises derivative estimation filter banks 620 and 630 (FIG. 6) wherein the matched filters 510–518 of the derivative estimation filter bank 620 have a smaller time scale than the matched filters 610–618 of the derivative estimation filter bank 630. In this embodiment, the matched filters 510–518 and 610–618 both provide the derivative values at the various points of interest as described herein above. However, in one embodiment, the derivative values from the matched filters 510–518 are not allowed to determine a boil phase if the length of the boil is greater than a predetermined time. As such, one of the derivative estimation filter banks 620 and 630 is chosen based on the length of time of the boil and that one derivative estimation filter bank 620 and 630 is used to estimate the derivative of the filtered acoustic signal 410.

The detection of the boil phases is carried out by a series of feature recognition steps using the data generated from the filtered acoustic signal 410 and the estimated derivative values. First, the point of leaving the lower plateau 110 marks the start of the acoustic cycle but precedes the boil phases of interest and is identified when the median filter 310 provides a signal that crosses a positive threshold value. In one embodiment, the specific threshold value is set to a heuristically determined value that corresponds with about 30% of the previously measured peak value of the filtered acoustic signal 410. The point of leaving the lower plateau 110 serves as a trigger for successive detection steps, and detection before the point of leaving the lower plateau 110 has occurred would lead to false indications because of the high sensitivity of the first derivative 412. In addition, the feature recognition algorithm 220 is capable of detecting a lower signal to noise ratio in the filtered acoustic signal 410 during the early phases of heating. Next, detecting the next instance at which the positive going first derivative signal 412 crosses zero identifies the pre-simmer phase 150. In addition, the pre-simmer phase is associated with the peaking of the filtered acoustic signal 410. The threshold point corresponding to the onset of rolling boil 165 is continuously calculated as a weighted sum of two previously occurring values of the filtered acoustic signal 410 or is determined using the RMS values of two previously occurring threshold values as described herein above. The ratio of the weights in the calculation is regarded as a tuning parameter, and the threshold 165 calculation has been correlated to the next onset of rolling boil. Detecting the next instance at which the first derivative 412 crosses a small negative threshold value identifies the rolling boil phase 180. Typically, the rolling boil phase 180 is obtained using a continuously calculated value of 20% of the minimum value of the first derivative signal 412 or the onset of boiling is estimated by extrapolating a line between the simmer phase point 160 and the threshold point 165.

Figure 7:
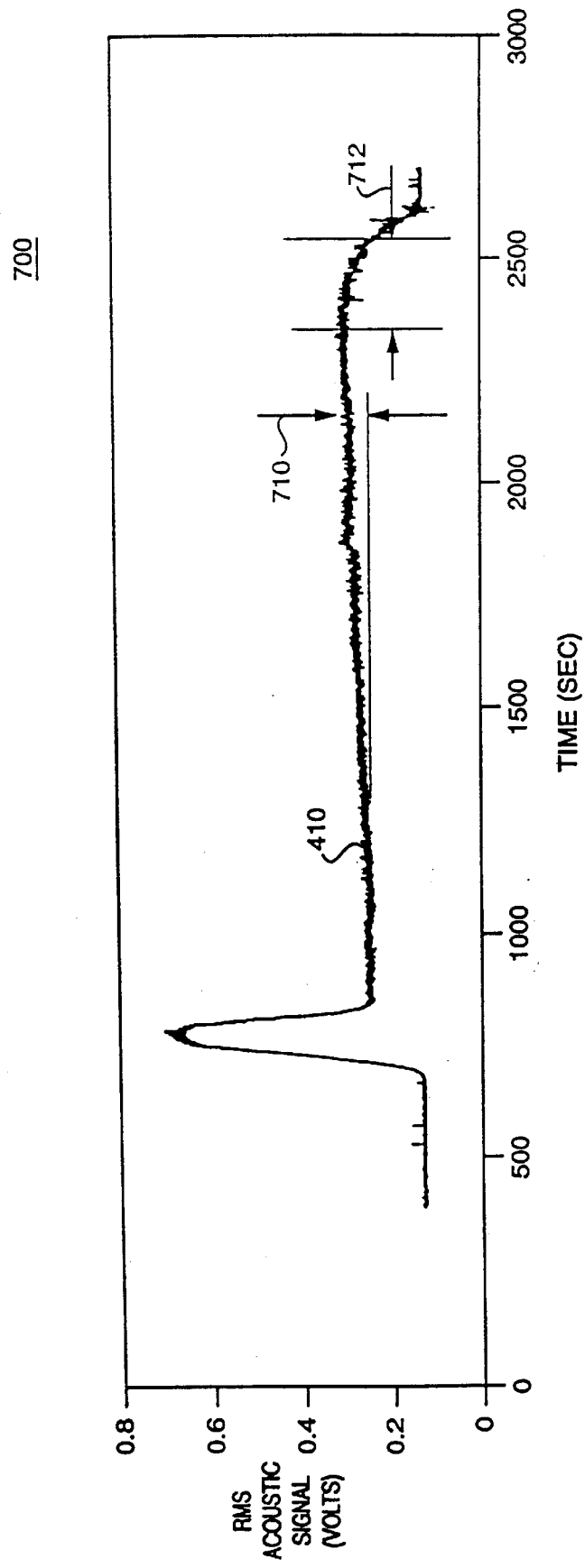
FIG. 7 is a graph of the acoustic signal before, during a boil and during a boil dry condition.

In another embodiment, a boil dry state is identified as the condition when the liquid contents of the heated utensil evaporate during the boil phase. The boil dry condition occurs after rolling boil phase 180 has been reached. This boil dry condition generates an acoustic boil dry waveform 700 as shown in FIG. 7. The boil dry condition is identified in the interval between about 2333 seconds and about 2600 seconds and is shown by a gradual decrease in the filtered acoustic signal 410 after an acoustic increase 710. In one embodiment, the rate of change illustrative of a boil dry condition can be identified as 50% magnitude reduction in the filtered acoustic signal 410 over a 200 second time interval 712 after the rolling boil phase 180 has been reached. Additionally, the magnitude of acoustic signal 410 may have an acoustic increase 710 by about 10% as the liquid boils off before the boil dry condition is reached. In another embodiment, the boil dry condition can be identified after the threshold point 165 by detecting the succeeding instance at which filtered acoustic signal 410 crosses a small positive threshold value. The boil dry threshold value is calculated as a percentage of the plateau value observed during the rolling boil phase 180. In a preferred embodiment, a 10% increase of the plateau value is used to identify the boil dry threshold value.

Figure 8:
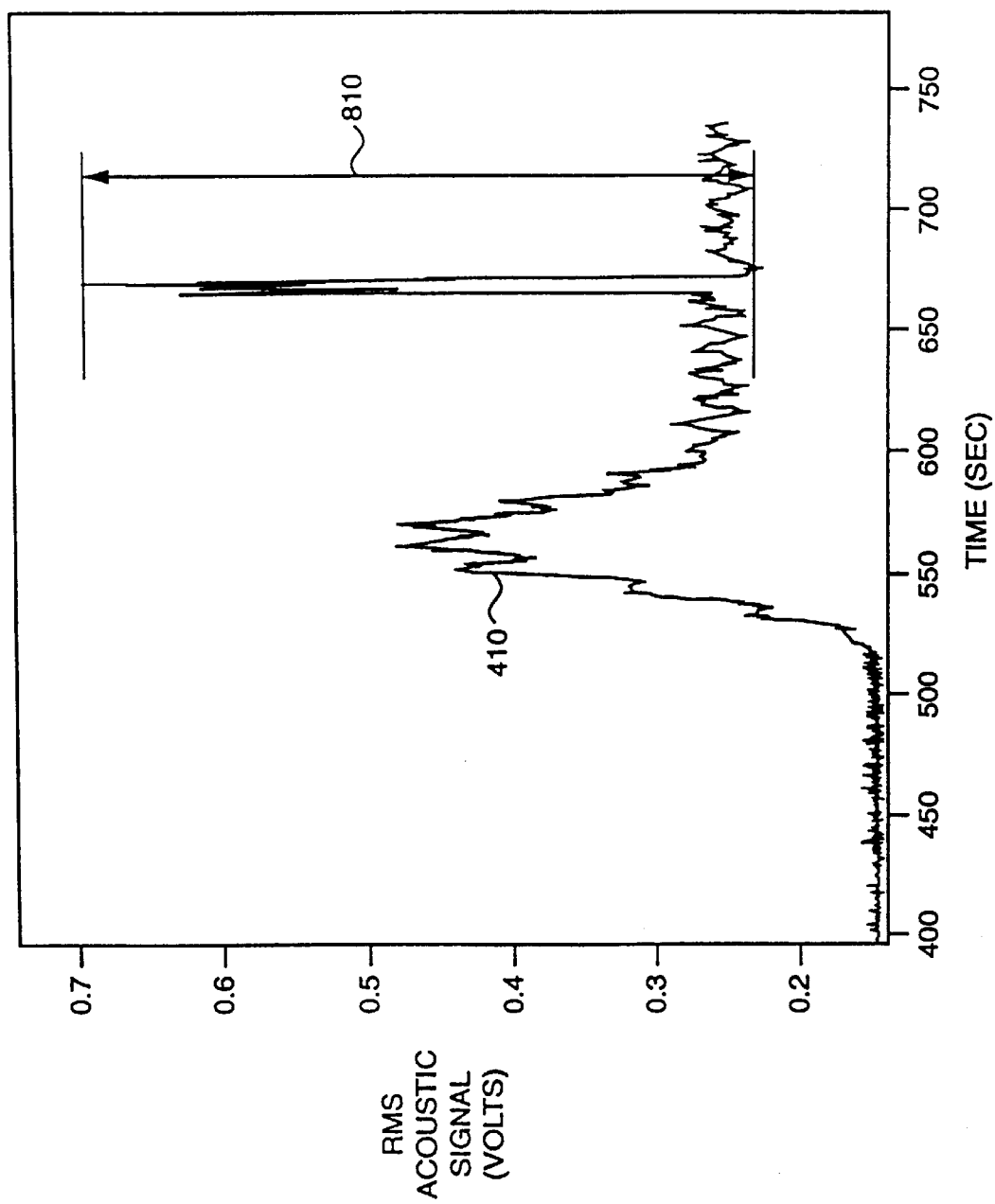
FIG. 8 is a graph of the acoustic signal before and during a boil over condition.

In even another embodiment, a boil over condition is characterized by when the liquid contents of the utensil (not shown) begins to boil over the side of the utensil (not shown) onto the cooktop (not shown). As shown in FIG. 8, the boil over condition generates a characteristic increase in the filtered acoustic signal 410 after rolling boil phase 180 has been reached and is indicated by the high level modulation 810 in the amplitude of filtered acoustic signal 410. In one embodiment, the boil over modulation range 810 reaches 50% of the maximum amplitude of filtered acoustic signal 410 after the rolling boil phase 180 has been reached.

The foregoing discussion of the invention has been presented for purposes of illustration and description. Further, the description is not intended to limit the invention to the form disclosed herein. Consequently, variations and modifications commensurate with the above teachings, and with the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for determining at least one boil phase of a liquid from an acoustic signal generated by the liquid during heating and measured by an acoustic sensor, the apparatus comprising:
   at least one filter connected to the acoustic sensor for receiving and filtering the acoustic signal to eliminate excess variation and high frequency noise from the acoustic signal and producing a filtered acoustic signal;
   at least one derivative estimation filter connected to the at least one filter for estimating at least one estimated derivative value of the filtered acoustic signal; and
   a processor connected to the at least one filter and the at least one derivative estimation filter for identifying the at least one boil phase of the liquid using at least the filtered acoustic signal and the at least one estimated derivative value of the filtered acoustic signal.

2. The apparatus of claim 1 wherein the at least one boil phase is selected from the group consisting of a pre-simmer phase, a simmer phase, a pre-boil phase and a rolling boil phase.

3. The apparatus of claim 1 wherein the processor comprises a feature recognition algorithm for evaluating the filtered acoustic signal and the at least one estimated derivative value to identify at least a boil over phase.

4. The apparatus of claim 1 wherein the processor comprises a feature recognition algorithm for evaluating the filtered acoustic signal and the at least one estimated derivative value to identify at least a boil dry condition.

5. The apparatus of claim 1 wherein the derivative estimation filter comprises a plurality of matched filters receiving the filtered acoustic signal, each of the plurality of matched filters corresponding to a predetermined estimated derivative value.

6. The apparatus of claim 5 wherein each of the plurality of matched filters comprises a finite impulse response (FIR) filter.

7. The apparatus of claim 5 wherein each of the plurality of matched filters is normalized to a different predetermined slope corresponding to the different predetermined estimated derivative value.

8. The apparatus of claim 7 wherein the different predetermined estimated derivative value of the acoustic signal at a predetermined time is estimated by the predetermined slope of one of the plurality of matched filters having a maximum output signal of the plurality of matched filters at the predetermined time.

9. The apparatus of claim 1 wherein the processor comprises the at least one derivative estimation filter.

10. An apparatus for determining at least one boil phase of a liquid from an acoustic signal generated by the liquid during heating and measured by an acoustic sensor, the apparatus comprising:
   at least one filter connected to the acoustic sensor for receiving and filtering the acoustic signal to eliminate excess variation and high frequency noise from the acoustic signal and producing a filtered acoustic signal;
   a first time scale derivative estimation filter bank connected to the at least one filter and comprising a plurality of matched filters for estimating at least one estimated derivative value of the filtered acoustic signal, each of the plurality of matched filters comprising a first time scale and a first coefficient length;
   a second time scale derivative estimation filter bank connected to the at least one filter and comprising a plurality of matched filters for estimating at least one estimated derivative value of the filtered acoustic signal, each of the plurality of matched filters comprising a second time scale and a second coefficient length; and
   a processor connected to the at least one filter, the first time scale derivative estimation filter bank and the second time scale derivative estimation filter bank, the processor identifying the at least one boil phase of the liquid using at least the filtered acoustic signal and the at least one estimated derivative value of the filtered acoustic signal provided from at least one of the first time scale derivative estimation filter bank and the second time scale derivative estimation filter bank.

11. The apparatus of claim 10 wherein the at least one boil phase is selected from the group consisting of a pre-simmer phase, a simmer phase, a pre-boil phase and a rolling boil phase.

12. The apparatus of claim 10 wherein the processor comprises a feature recognition algorithm for evaluating the filtered acoustic signal and the at least one estimated derivative value to identify at least a boil over phase.

13. The apparatus of claim 10 wherein the processor comprises a feature recognition algorithm for evaluating the filtered acoustic signal and the at least one estimated derivative value to identify at least a boil dry condition.

14. The apparatus of claim 10 wherein the processor comprises a plurality of feature recognition algorithms wherein one of the plurality of feature recognition algorithms is connected to the first time scale derivative estimation filter bank and another of the plurality of feature recognition algorithms is connected to the second time scale derivative estimation filter bank.

15. The apparatus of claim 10 wherein each of the plurality of matched filters comprises a finite impulse response (FIR) filter.

16. The apparatus of claim 10 wherein a corresponding pair of matched filters comprises one matched filter from each of the first time scale derivative estimation filter bank and the second time scale derivative estimation filter bank, the corresponding pair of matched filters being normalized to a predetermined slope corresponding to a predetermined estimated derivative value.

17. The apparatus of claim 10 wherein the first and second time scales are about 1 hertz (Hz).

18. The apparatus of claim 10 wherein the first coefficient length is about 71 and the second coefficient length is about 142.

19. The apparatus of claim 10 wherein each of the plurality of matched filters of the first time scale derivative estimation filter bank comprise a finite impulse response (FIR) filter wherein the first time scale is about 1 hertz (Hz) and the first coefficient length is about 71, and each of the plurality of matched filters of the second time scale derivative estimation filter bank comprise a finite impulse response (FIR) filter wherein the second time scale is about 1 hertz (Hz) and the second coefficient length is about 142.

20. The apparatus of claim 19 wherein the processor prevents identification of the at least one boil phase provided by an estimated derivative value from the first time scale derivative estimation filter bank after a predetermined amount of time.

21. The apparatus of claim 10 wherein the processor comprises the first time scale derivative estimation filter bank and the first time scale derivative estimation filter bank.

22. A method of determining at least one boil phase of a liquid as measured by an acoustic sensor employed to measure an acoustic signal generated by the liquid during heating, said method comprising the steps of:
   providing an root-mean-square (RMS) of the acoustic signal;
   smoothing the RMS acoustic signal to eliminate excess variation and high frequency noise in the acoustic signal;
   estimating at least one estimated derivative value of the smoothed RMS acoustic signal using at least one derivative estimation filter; and
   determining the at least one boil phase of the liquid using a feature recognition algorithm to evaluate the smoothed RMS acoustic signal and the at least one estimated derivative of the smoothed RMS acoustic signal.

23. The method of claim 22 wherein the step of determining the at least one boil phase of the liquid comprises identifying the at least one boil phase selected from the group consisting of a pre-simmer phase, a simmer phase, a pre-boil phase, and a rolling boil phase.

24. The method of claim 22 wherein the step of smoothing the RMS acoustic signal comprises the steps of:
   filtering the RMS acoustic signal using a low pass filter to remove high frequency noise; and
   median filtering the filtered RMS acoustic signal to remove the excess variation in the filtered RMS acoustic signal.

25. The method of claim 22 wherein the step of determining the at least one boil phase comprises correlating a first zero slope point of the at least one estimated derivative of the smoothed RMS acoustic signal and a positive going inflection point of smoothed RMS acoustic signal to a pre-simmer phase.

26. The method of claim 22 wherein the step of determining the at least one boil phase comprises correlating a first zero slope point of the smoothed RMS acoustic signal and a zero crossing point of the at least one estimated derivative of the smoothed RMS acoustic signal to a simmer phase.

27. The method of claim 22 wherein the step of determining the at least one boil phase comprises correlating a second zero slope point of the at least one estimated derivative of the smoothed RMS acoustic signal and a negative going inflection point of the smoothed RMS acoustic signal to a pre-boil phase.

28. The method of claim 22 wherein the step of determining the at least one boil phase comprises determining a boil point corresponding to the at least one estimated derivative of the smoothed RMS acoustic signal reaching a pre-determined threshold after a pre-boil phase.

29. The method of claim 22 wherein the step of determining the at least one boil phase comprises estimating a boil onset phase by extrapolating from a simmer phase and a pre-determined threshold after boil phase.

30. The method of claim 22 further comprising the step of identifying a boil dry condition by analyzing the smoothed RMS acoustic signal and the at least one estimated derivative of the smoothed RMS acoustic signal.

31. The method of claim 30 wherein said step of identifying said boil dry condition comprises determining at least about a 50 percent reduction in an amplitude of the smoothed RMS acoustic signal after determination of a rolling boil phase of the at least one boil phase of the liquid.

32. The method of claim 22 further comprising the step of identifying a boil over condition by analyzing the smoothed RMS acoustic signal and the at least one estimated derivative of the smoothed RMS acoustic signal.

33. The method of claim 32 wherein said step of identifying said boil over condition comprises determining at least about a 50 percent increase in an amplitude of the smoothed RMS acoustic signal after determination of a rolling boil phase of the at least one boil phase of the liquid.

34. The method of claim 32 wherein said step of determining the at least one estimated derivative comprises estimating the at least one derivative using at least one derivative estimation filter bank.

35. A method of determining at least one boil phase of a liquid as measured by an acoustic sensor utilized to measure an acoustic signal generated by a liquid during heating, said method comprising the steps of:

filtering the acoustic signal to remove excess variation and high frequency noise from the acoustic signal;

estimating at least one estimated derivative of the filtered acoustic signal using a plurality of derivative estimation filter banks, each of the plurality of derivative estimation filter banks having a unique predetermined coefficient length and a unique time scale;

choosing one of the plurality of derivative estimation filter banks to estimate the at least one estimated derivative of the filtered acoustic signal based on a time length of boiling;

using the chosen one of the plurality of derivative estimation filter banks to estimate the at least one estimated derivative of the filtered acoustic signal; and identifying the at least one boil phase of the liquid by analyzing the filtered acoustic signal and the at least one estimated derivative of the filtered acoustic signal.

36. The method of claim 35 wherein the step of identifying said at least one boil phase comprises identifying said at least one boil phase selected from the group consisting of a pre-simmer phase, a simmer phase, a pre-boil phase, and a rolling boil phase.

37. The method of claim 35 wherein the step of filtering the acoustic signal comprises using a median filter to remove excess variation of the acoustic signal and using a low pass filter to remove high frequency noise from the acoustic signal.

* * * * *